United States Patent
Mattes

(10) Patent No.: US 6,553,846 B2
(45) Date of Patent: Apr. 29, 2003

(54) DEVICE FOR DETERMINING DEFORMATIONS OF MOTOR VEHICLE COMPONENTS

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/971,957

(22) Filed: Oct. 5, 2001

(65) Prior Publication Data

US 2002/0084637 A1 Jul. 4, 2002

(30) Foreign Application Priority Data

Oct. 5, 2000 (DE) .......................... 100 49 324

(51) Int. Cl.⁷ .............................. G01L 1/22; G01B 7/16
(52) U.S. Cl. ..................... 73/862.045; 73/768
(58) Field of Search ................... 73/12.04, 768, 73/862.045

(56) References Cited

U.S. PATENT DOCUMENTS

| | | | | |
|---|---|---|---|---|
| 4,700,973 A | * | 10/1987 | Gademann et al. | 180/282 |
| 4,816,200 A | * | 3/1989 | Stecher et al. | 264/317 |
| 5,335,544 A | * | 8/1994 | Wagner et al. | 73/514.32 |
| 5,509,308 A | * | 4/1996 | Iwata et al. | 73/514.09 |
| 5,633,461 A | * | 5/1997 | Kakizaki et al. | 341/158 |

* cited by examiner

Primary Examiner—Hezron Williams
Assistant Examiner—Lilybett Martir
(74) Attorney, Agent, or Firm—Michael J. Striker

(57) ABSTRACT

A device for detecting a side impact of a vehicle an acceleration sensor provided in components of the vehicle and controlling a release of a side bag for protecting vehicle occupants, and a sensor for sensing a beginning of a plastic deformation of components provided on the components of the vehicle and reducing a release threshold for activation of the side bag.

8 Claims, 3 Drawing Sheets

DEVICE FOR DETERMINING DEFORMATIONS OF MOTOR VEHICLE COMPONENTS

BACKGROUND OF THE INVENTION

The present invention relates to a device for determining deformations of motor vehicle components.

The release point of a side bag in the case of side impact situations in the motor vehicles is mainly sensed by acceleration sensors. They are mainly located in the region of seat cross members, the sills in the door region, in particular B or C pillars of the vehicle passenger compartment in a motor vehicle.

It has been determined with air pressure sensors that in the case of not side impact-caused pressure increases in the door cavities of the motor vehicles and in the case of exceeding of the sensitive first side bag release threshold, an undesired release of the side bag can occur. This can for example occur in the case of a sudden slam of the vehicle doors or release of the front bags.

In the case of a pole impact in the door center, the shortest side bag release times are required. During the release time the unobjectionable unfolding of a thorax side bag which is built in the vehicle or a side bag which is integrated in the seat back must be guaranteed, so that in this impact situations which can lead to dangerous injuries in the door center a maximum protection at the deformation-critical location is provided for the vehicle occupants. On the other hand, the non-release threshold of a side bag must be set at vehicle speeds between 20 and 25 km/h, to provide the required robustness of the sensor device against an undesirable release in the situations which are not critical for the vehicle occupants, substantially during sudden slams of the vehicle doors.

A very fine parameter adjustment in the release algorithm of the air bag sensors in the cavities of the vehicle doors leads in the case of the danger to desired short release times. On the other hand the release threshold is reduced to undesirable 10–15 km/h vehicle speed, which leads to above described disadvantages.

Pressure sensors in the case of pole impact in the center of a soft vehicle door from the point of view of rigidity have short response times, when compared with acceleration sensors arranged on the vehicle structure, however they have the above mentioned disadvantages. Pressure is a scalar variable, with which it is not important whether they originate from the vehicle interior (pressure build up by simultaneous release of both front air bags by door slams with closed window/sliding roof surfaces) or from outside of the vehicle occupant compartment, for example in the case of a side impact on the vehicle.

SUMMARY OF THE INVENTION

Accordingly, it is an object of the present invention to provide a device for determining a deformations of motor vehicle components, which avoids the disadvantages of the prior art.

In keeping with these objects and with others which will become apparent hereinafter, one feature of present invention resides, briefly stated, in a device for detecting side impacts on a vehicle, wherein on the component of the vehicle, an element is provided which senses a beginning of a plastic component deformation and reduces a release threshold for activation of a side bag.

With the inventive device additionally to the evaluation of signals of peripheral acceleration sensors, the deformation of the door outer plate, for example the plastic door plate deformation is sensed by a strain gauge sensor. The strain gauge sensor is arranged in the cavity between the motor vehicle door exterior and the motor vehicle door interior, for example on a door reinforcing element (tube, profile plate and the like). With the additional detection of the deformation of the door, the door impact can be recognized extremely fast, for example after 3–5 ms.

When additionally to the acceleration sensor, a strain gauge sensor is provided for each vehicle door, the injury-causing side impact situation can be detected after 3–5 ms time interval. With the signal produced by the strain gauge sensor the release threshold of the acceleration sensor provided for example on the B-pillar of a motor vehicle can be reduced, so that the side bag which protects the head and thorax region of the vehicle occupant can be activated in the correct time.

In the case of the use however of a sensor which responds to pressure, a lateral impact can be detected first after approximately 6 ms, with an inflation time of the side bag of approximately 10 ms for the thorax side bag, halving of the detection time means a decisive time benefit with regard to the passive safety of the vehicle occupants.

In addition to the use in the cavity of a vehicle door, the strain gauge sensor in a comparable way can be also mounted in the front body region of a motor vehicle, for example on the front motor hood lower side, for pedestrian impact recognition.

The strain gauge can be riveted in advantageous manner to the deformation bodies whose elastic deformation start is to be sensed, so that any defective components can be easily exchanged, while the component to be monitored, for example a vehicle door can however remain to be used. For this purpose the strain gauge sensor can be riveted simply to the reinforcing bar in the door cavity so that an expensive direct welding or glueing on the deformation part can be dispensed with.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
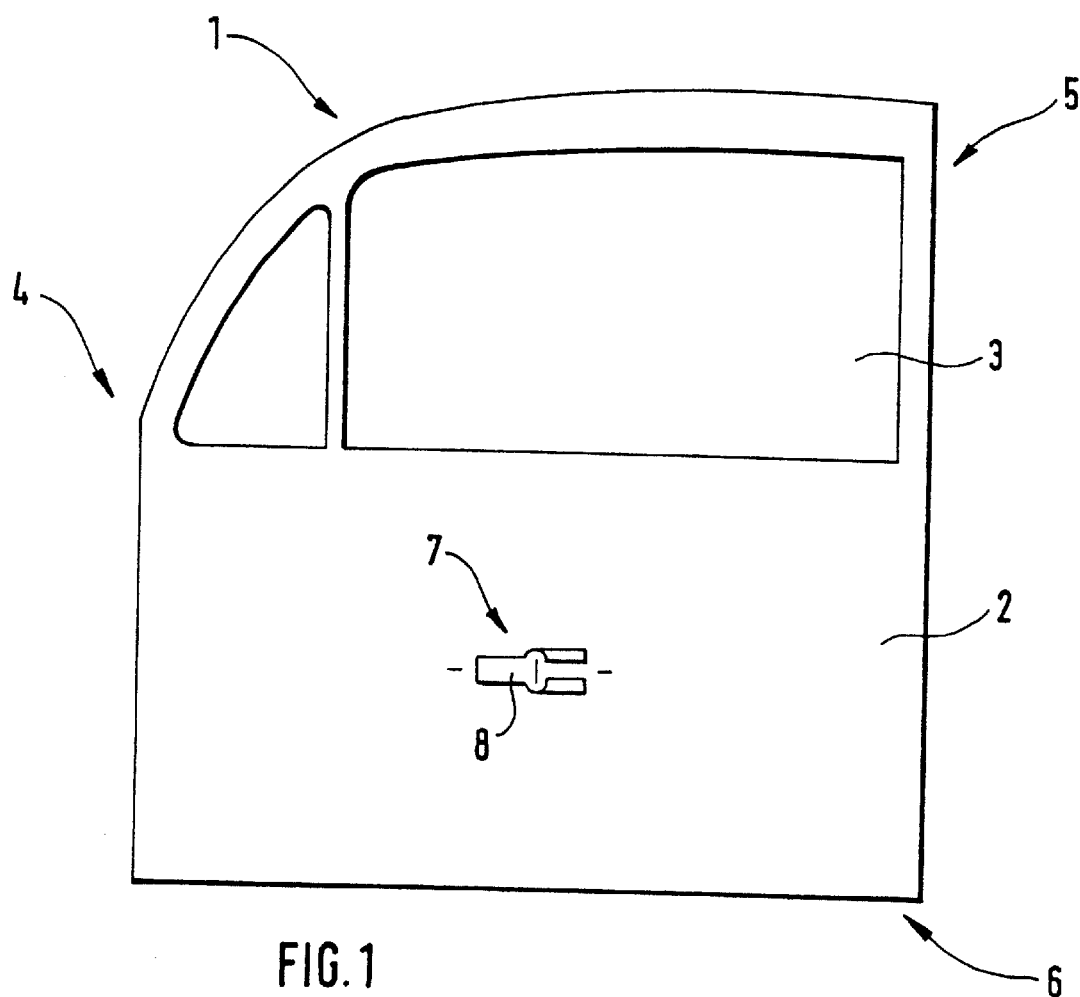
FIG. 1 is a view showing a driver or a co-driver door with a predetermined mounting position for a strain gauge sensor in accordance with the present invention.

FIG. 1 shows a view of a driver/co-driver door of a motor vehicle with a predetermined mounting position for a strain gauge sensor in the door interior on the reinforcement bar or reinforcing element. In FIG. 1 a motor vehicle component 1 is a vehicle door.

The vehicle door includes a door plate 2 and a recess 3 for the window plate. Reference numeral 4 identifies an A pillar region, reference numeral 5 identifies a B pillar region, and reference numeral 6 identify a door sill on the lower side of the vehicle door 1. A sensor element 8 formed as a strain gauge sensor is arranged on the sensor position 7 substantially opposite to the center of the door plate 2 on the reinforcing element in the door interior. In the configuration shown in FIG. 1 the sensor element 8 which senses the deformation of the reinforcing element is a single strain gauge strip element.

The sensor element 8 which is formed as a strain gauge sensor is designed to be sensitive to stretching and bending in a micrometer region and has a k factor of approximately 2. This means that with 1% longitudinal change of the strain gauge sensor, the resistance of the sensor element 8 changes by 2%. A very precise deformation-or in other words-force measuring sensor can be realized with strain gauge strips. Moreover, the strain gauge sensors make possible a one time longitudinal change of approximately 10%. The sensor elements 8 shown in FIG. 1 cover an area of approximately 0.1 cm$^2$, so that for a 10% longitudinal change at the strain gauge sensor 8 a door reinforcing element deformation is required which extends far into the plastic region.

This means that a side bag release must take place before breaking of the strain gauge sensor by exceeding the 10% longitudinal change.

Figure 2:
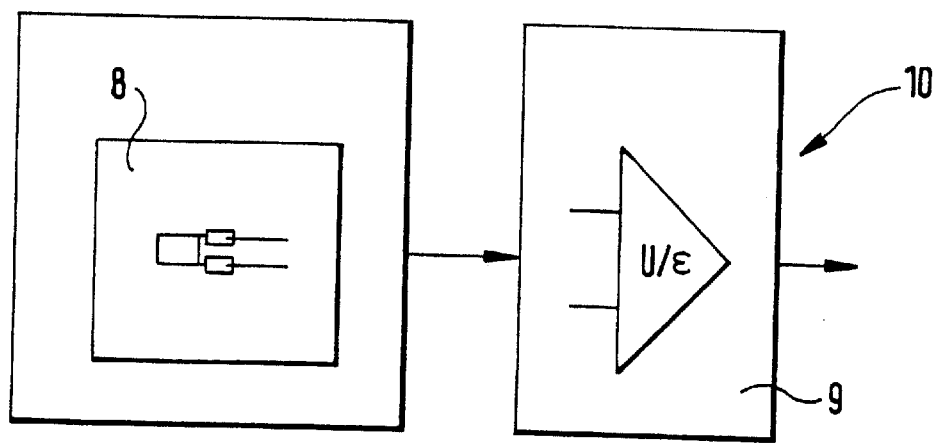
FIG. 2 is a schematic view of an amplification circuit for the device in accordance with the present invention.

FIG. 2 shows an evaluating circuit or an amplifying arrangement for the strain gauge sensor. The deformation of the door reinforcing element can cause an elongation or bending of the strain gauge sensor 8. The substantial change of exceeding one or several thresholds is monitored in the release algorithm software of the air bag release device.

In contrast to the absolute weight sensing required for the passenger classification, for each impact recognition a dynamic measurement is sufficient. For this purpose the configuration of an amplifying circuit 10 in FIG. 2 is formed so that its amplifier 9 is formed as an alternating voltage amplifier. This is much simpler and less expensive than a direct voltage amplifier. The alternating voltage amplifier 9 is coupled through a hardware high pass with a suitable lower cut-off frequency. The exact lower cut-off frequency is adjusted with a higher and more accurately determinable software high pass.

Figure 3:
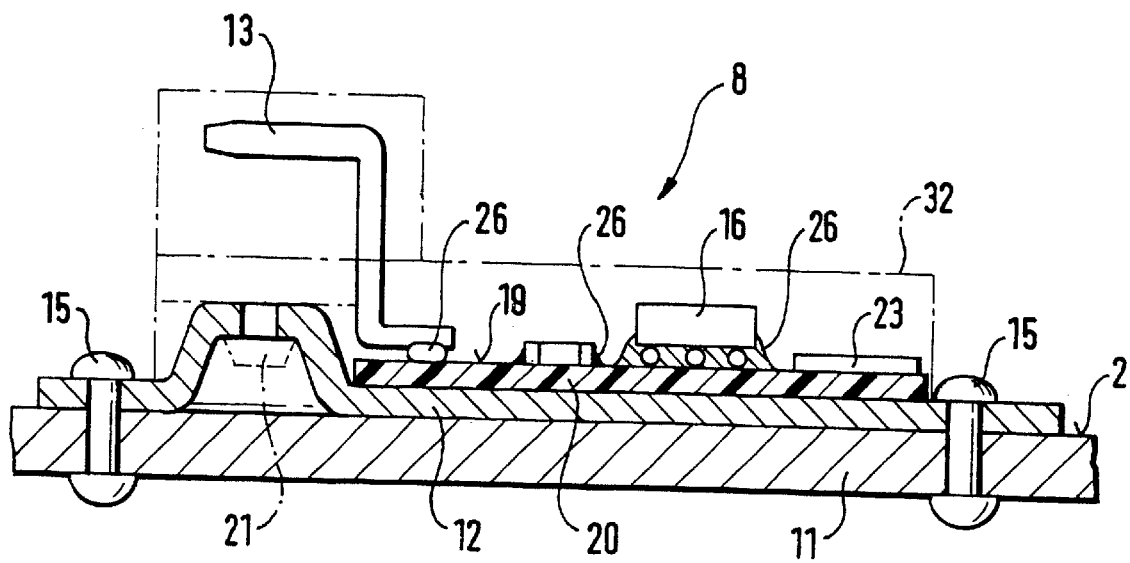
FIG. 3 is a view schematically showing a mounting principle of a stretching gauge strip sensor for the device in accordance With the present invention.

FIG. 3 shows a structural principle of a strain gauge sensor. A sensor element 8 is arranged on a door reinforcing element of a motor vehicle door. The door reinforcing element can be formed with different plate thicknesses. In modern passenger motor vehicles the door plate thicknesses depending on the manufacture can vary between 0.5 mm and 1.0 mm. The sensor element 8 in accordance with FIG. 3 is arranged on a steel bottom support 12 which is formed as a steel plate bottom plate with a thickness of 0.5 mm and is covered by a synthetic plastic cover 32 shown in broken lines. The steel bottom support 12 is mounted by a separable mounting in form of rivets, releasably on the door reinforcing element in the cavity of a motor vehicle door. This mounting type has the advantage that a defective sensor element 8 can be removed from its mounting position 7 in the door interior, while the component 1 for example a motor vehicle door can further remain in operation, and in the case of the defective sensor no exchange of the complete component 1 is required.

A printed circuit board (pcb) 20 is mounted on the steel bottom plate 12. A plurality of electronic components in the form of ceramic chip capacitors 27, connecting elements 13 as well as an integrated evaluation circuit identified with reference numeral 16 are arranged on an upper side 19 of the plate 12. The mounting of the pcb 20, of the electronic elements as well as the electronic components on the pcb 20 on a thin steel plate support 12 is required to realize on the sensor element 8 the required bending weakness which must be of little influence on the bending properties of the door reinforcing element 11.

Figure 4:
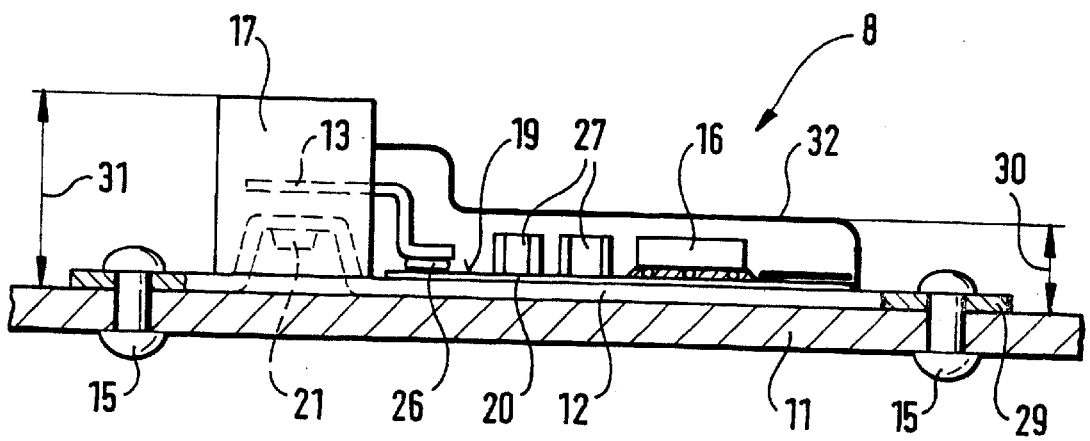
FIG. 4 is a side view of the strain gauge strip sensor element with snapped-in connector together with connector pins for device for present invention.

FIG. 4 shows the side view of a strain gauge sensor element with a plug connection element 17 engaged on a steel bottom plate 12 having a recess 14 and with connector pins 13 arranged on it. The sensor element 8 in accordance with FIG. 4 analogously to the sensor element of FIG. 3 is mounted by separable mounting rivets 15 on the side of a door reinforcing element. The steel bottom plate 12 is for example 0.5 mm thick and receives a printed circuit board 20 on its upper side, which is mounted with a temperature-resistant adhesive 28 on the upper side of the steel bottom plate 12. Reference numeral 29 designates the thickness of the steel bottom plate 12. The flex printed circuit board 20 is composed of a Capton foil 25. It serves as a component and connecting conductor support for the strain gauge sensor, which can be formed as a NiCr or constantan layer and welded on the steel bottom plate 12 on an insulating layer. The flex printed circuit board serves furthermore as a carrier for the evaluating integrated circuit 16 and a number of discreet ceramic chip capacitors 27.

The height of the structure of the sensor arrangement 8 from the door reinforcing element to the upper side of the cover 32 which covers the switching device, amounts to only a few mm as identified with reference numeral 30. In the embodiment of FIG. 4 it amounts to approximately 6 mm. In the region of the plug element 17 which is arranged with two snap-in hooks 21 of the upper side of the steel bottom plate, the total height identified with reference numeral 31 amounts to approximately 18 mm. The plug pins 13 which in the region of their extension through the plug 17 are identified with a broken line, are connected with the printed circuit board 20 carrying the electronic components by a reflow solder connection 26.

Figure 7:
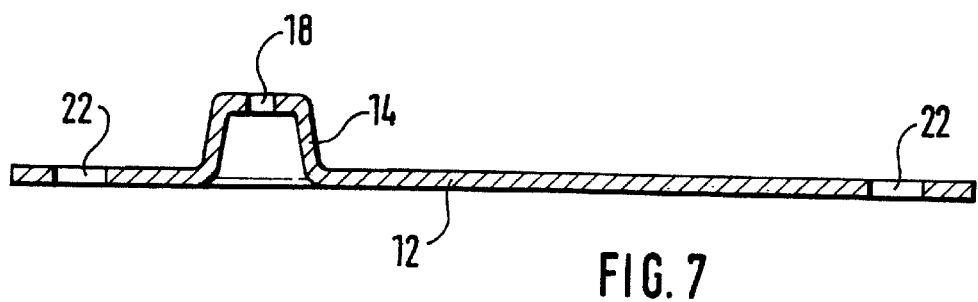
FIG. 7 is a side view of the steel plate support of the device in accordance with the present invention.

After sputtering of the strain gauge strip sensor on the Capton foil 25 and its glueing by the temperature-resistant adhesive connection 28 on the steel bottom plate 12, the electronic components and both plug pins 13 are contacted in a single reflow soldering step 26. The plug housing 17 is attached to the steel bottom plate 12 in an advantageous manner with the injected snap-in projections 21. Between the door reinforcing element 11 and the lower side of the steel bottom plate 12, because of the deep-drawn cavern in the steel bottom 12, a sufficient space for the plug snap-in projections is provided as can be seen from FIG. 7.

The synthetic plastic cover 32 of the sensor strain gauge 8 is engaged for example only on the plug housing 17. In order to guarantee the water tightness against spraying water or against rain water which enters through a door seal, the cover 32 is glued circumferentially with an adhesive 28 to the steel bottom plate 12 which is mounted on the door reinforcing element by rivets 15.

Figure 5:
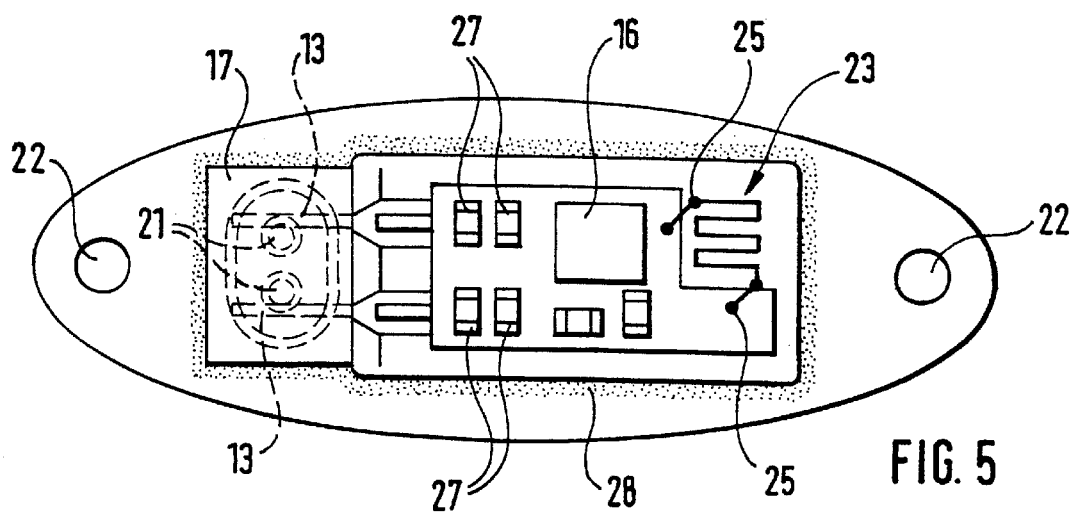
FIG. 5 is a plan view of the strain gauge sensor of the inventive device shown in FIG. 4.

FIG. 5 shows the plan view of the sensor element 8 of FIG. 4. In this configuration the openings 22 are positioned so that the strain gauge sensor 8 can be separably connected with the door reinforcing element 11 by the rivits 15 which extend through them.

FIG. 5 shows the course of the adhesive seam 28 for protecting the electronic component 16 or 27 from penetration of moisture. The plug pins 13 are shown in a broken line and injected in the plug 17 engaged with the steel bottom plate 12. Reference numeral 23 identifies in FIG. 5 a stretching measuring strip resistor. The meander orientation extends parallel to the longitudinal axis of the door deformation element 11, so that its bending in direction of the vehicle inner space can be measured.

The use of a Capton foil 25 as a flex printed circuit board 20, the formation of the steel bottom plate 12 as a thin-wall bottom plate with a material thickness of only 0.5, as well as a thin-wall cover 32 mounted in extremely low height guarantees the required ductility as well as the low bending property of the strain gauge sensor 8 in accordance with the embodiments shown in FIGS. 3 and 4. It is therefore guaranteed that the own rigidity of the strain gauge sensor component 8 does not falsify the deformation behavior of the deformation support.

Figure 6:
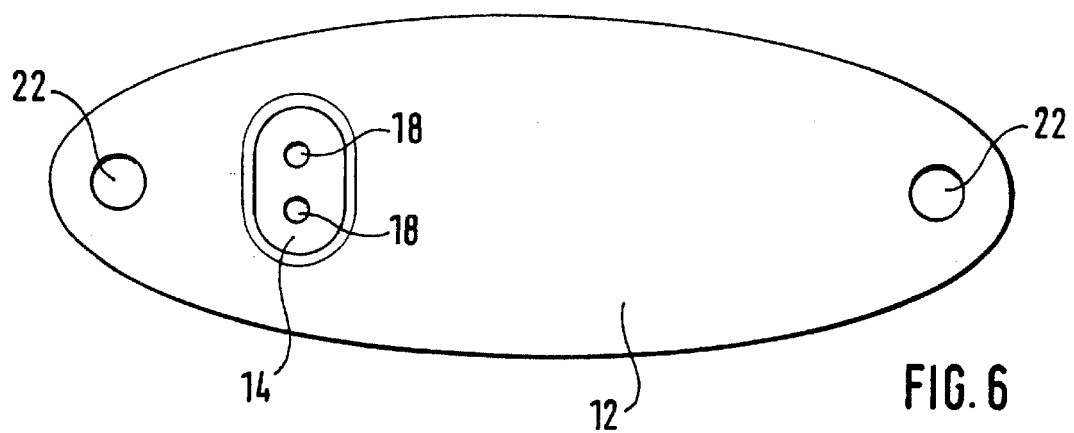
FIG. 6 is a view showing a configuration of the steel plate support for receiving sensor components of the inventive device.

FIG. 6 shows a plan view of a correspondingly configurated steel bottom plate 12. Reference numerals 18 identify the openings in the steel bottom plate with 0.5 mm thickness, in which the snap-in projections 21 of the plug element 17 can be arrested. The printed circuit board (pcb) 20 shown in FIGS. 4 and 5 is formed as a flexible Capton foil and carries the individual electronic components. In accordance with the opening pattern of openings in FIG. 6, two openings 22 are provided for mounting of the steel bottom plate 12 on the door reinforcing element 11. Therefore, with a corresponding number of rivets 15, the steel bottom plate together with the plate 20 can be mounted in a cavity of a motor vehicle door.

Such riveted deformation sensors 8 provide for a possibility of occupant protection improvement in the case of side impacts and substantially reduce the injury risk of the vehicle occupants. A sensor element 8 in accordance with the present invention which detects the deformation of the motor vehicle components, can be arranged in a similar way also on a front motor hood region of a motor vehicle and serves for pedestrian impact recognition. It is possible to separably arrange deformation sensors for pedestrian impact recognition as contact sensors on a bumper support in the front region of the motor vehicle, to measure around a bending axis and to be connected just with two rivets.

The mounting of the inventive strain gauge sensor element 8 with the use of two rivets is considered in the automobile industry as especially advantageous since the rivet connection in the interior of the door represents today a conventional and usable mounting type in automobile manufacture. Moreover, the strain gauge sensor can be only riveted and not screwed, since the screw connection over its service life can loose a tightening force. In advantageous manner in accordance with the present invention the stretching measuring strip sensor can be simply exchanged. In the case of mounting proposed here, the strain gauge sensor is not glued or welded with the door reinforcing element, since otherwise in the case of defective strain gauge sensor element 8 the total component, or in other words a vehicle door must be exchanged.

Advantageously the strain gauge strip 23 is directly welded on the steel bottom plate 12 and its both connecting points are contacted on the flex printed circuit board 20 with two bonds 25. Therefore the creep effect with the glued strain gauge strip elements is avoided. The printed circuit board 20 is correspondingly cut out at the side of the strain gauge sensor element 23 in FIG. 5.

It will be understood that each of the elements described above, or two or more together, may also find a useful application in other types of constructions differing from the types described above.

While the invention has been illustrated and described as embodied in device for determining deformations of motor vehicle components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for detecting a side impact of a vehicle, comprising deformation sensitive means provided in components of the vehicle and controlling a release of a side bag for protecting vehicle occupants; and means for sensing a beginning of an elastic deformation of components provided on the components of the vehicle and reducing a release threshold for activation of the side bag, and further comprising a flexible printed circuit board and a steel bottom plate, wherein the flexible printed circuit board is arranged on the steel bottom plate, the flexible printed circuit board carrying an evaluating integrated circuit and a plurality of electronic components, said steel bottom plate being connectable to an inner side of the deformable components by releasable mounting elements, wherein said steel bottom is bendable and does not influence the deformation of the components, and wherein a strain gauge sensor is disposed on said printed circuit board.

2. A device as defined in claim 1, wherein said strain gauge sensor has an output signal reducing the release threshold of the deformation sensitive means provided in the vehicle.

3. A device as defined in claim 2, wherein said strain gauge sensor has a single meandering resistance, wherein an amount change of said meandering resistance on exceeding one or several thresholds is monitored.

4. A device as defined in claim 3, wherein said resistance is oriented so that it measures a longitudinal change of the component to be monitored.

5. A device as defined in claim 3; wherein said resistance is welded to said steel bottom plate and connected to the component by a rivet connection.

6. A device as defined in claim 2, further comprising an alternating current amplifier, wherein said alternating current amplifier amplifies the output signal of said strain gauge sensor.

7. A device as defined in claim 6 wherein said amplifier is arranged on the printed circuit board affixed to said steel bottom plate.

8. A device as defined in claim 1, wherein said steel bottom plate has an upper side, wherein said flexible printed circuit board is provided on said upper side as a connection conductor support for said strain gauge sensor, said evaluating integrated circuit and said electronic components.

* * * * *